United States Patent
Lee et al.

(10) Patent No.: US 12,544,434 B2
(45) Date of Patent: Feb. 10, 2026

(54) RECOMBINANT LACTIC ACID BACTERIUM AND METHOD THEREOF FOR SIMULTANEOUS TREATMENT AND/OR PREVENTION OF DUST MITE AND COCKROACH ALLERGIES

(71) Applicant: Taichung Veterans General Hospital, Taichung (TW)

(72) Inventors: Mey Fann Lee, Taichung (TW); Yi-Hsing Chen, Taichung (TW)

(73) Assignee: Taichung Veterans General Hospital, Taichung (TW)

( * ) Notice: Subject to any disclaimer, the term of this patent is extended or adjusted under 35 U.S.C. 154(b) by 338 days.

(21) Appl. No.: 18/330,968

(22) Filed: Jun. 7, 2023

(65) Prior Publication Data
US 2024/0216496 A1 Jul. 4, 2024

(30) Foreign Application Priority Data
Dec. 30, 2022 (TW) .................... 111150991

(51) Int. Cl.
| | | |
|---|---|---|
| *A61K 39/09* | (2006.01) | |
| *A61K 35/74* | (2015.01) | |
| *A61P 11/06* | (2006.01) | |
| *A61P 17/00* | (2006.01) | |
| *A61P 37/08* | (2006.01) | |
| *C12N 1/20* | (2006.01) | |
| *C12N 15/74* | (2006.01) | |

(52) U.S. Cl.
CPC .............. *A61K 39/09* (2013.01); *A61K 35/74* (2013.01); *A61P 11/06* (2018.01); *A61P 17/00* (2018.01); *A61P 37/08* (2018.01); *C12N 1/20* (2013.01); *C12N 15/746* (2013.01); *C12N 2800/101* (2013.01)

(58) Field of Classification Search
CPC ...................................................... A61K 39/09
See application file for complete search history.

(56) References Cited

U.S. PATENT DOCUMENTS

| | | | | |
|---|---|---|---|---|
| 2002/0055168 A1* | 5/2002 | Smith | .................. | C12N 9/1048 |
| | | | | 435/325 |
| 2018/0080029 A1* | 3/2018 | Lee | ......................... | A23L 33/13 |
| 2020/0246298 A1* | 8/2020 | Park | ........................ | A61P 11/06 |

FOREIGN PATENT DOCUMENTS

TW 202010751 3/2020

OTHER PUBLICATIONS

Lorenz et al (Microbiological Reviews vol. 58, No. 3, pp. 563-602) (Year: 1994).*
Mey-Fann Lee, et al., "IgE-Binding Epitope Mapping and Tissue Localization of the Major American Cockroach Allergen Per a 2", Allergy Asthma & Immunology Research, vol. 7, No. 4, Apr. 21, 2015, pp. 376-383.

* cited by examiner

*Primary Examiner* — Albert M Navarro
(74) *Attorney, Agent, or Firm* — MUNCY, GEISSLER, OLDS & LOWE, P.C.

(57) ABSTRACT

A recombinant lactic acid bacterium and a method thereof for simultaneous treatment and/or prevention of dust mite and cockroach allergies. The recombinant lactic acid bacterium has a gene fragment with nucleotide coded as SEQ ID No: 1 to be capable of expressing the D2P2 protein with amino acid sequence of SEQ ID No: 2. Therefore, by administering an effective amount of the recombinant lactic acid bacterium to an individual is capable of effectively causing the individual's body to produce antibodies against dust mite and/or cockroach allergens, thereby achieving an efficacy of preventing and/or treating an allergic disease caused by dust mite and/or cockroach allergens.

3 Claims, 15 Drawing Sheets
Specification includes a Sequence Listing.

SEQUENCE LISTING

```
Sequence total quantity: 10
SEQ ID NO: 1            moltype = DNA  length = 798
FEATURE                 Location/Qualifiers
source                  1..798
                        mol_type = other DNA
                        organism = synthetic construct
SEQUENCE: 1
atgggtactg caggtgatca agttgatgtt aaagattgtg ccaatcatga aatcaaaaaa    60
gtccttgttc caggttgtca tggatcagaa ccatgtatta ttcatcgtgg gaaaccattt   120
caacttgaag ccctttttga agccaaccaa aataccaaaa acgctaaaat tgaaattaaa   180
gcttcaattg atggtcttga agttgacgtt ccaggtattg atccaaatgc ttgtcactat   240
gtcaaatgtc cacttgtcaa agggcaacaa tacgacatta aatacacctg gaatgttcca   300
aaaattgctc caaaatcaga aaacgttgtc gtcaccgtta aagttcttgg tgataatggt   360
gttcttgctt gtgctattgc tacacatgct aaaattcgtg atcctgtatc aaataacgtg   420
gcatccgtac gaattctcgg cagtggctat gccaacggat ctgaagccca cgactacatc   480
gcagtaagca ctctgaatgc tacgaatcaa ggcttcttgc tagcagatga catatcaaat   540
gatatatgtt ccctgggcgc tgattgtgta attggattgg gacgccccaa atctggaagg   600
gctgccttta atctgccgac tgttatggaa aatttcgtca accaagacaa tatcgccaac   660
tcgttctcat tccatcacgg aagatatccc gacggacagc accgcggagt tctggtgctc   720
ggaggcacaa tacctgccta ctataggggc gacttcactt acgtacctct cgtatctaga   780
gagctcagct ttctttga                                                 798
```

-continued

```
SEQ ID NO: 2            moltype = AA  length = 265
FEATURE                 Location/Qualifiers
source                  1..265
                        mol_type = protein
                        organism = synthetic construct
SEQUENCE: 2
MGTAGDQVDV KDCANHEIKK VLVPGCHGSE PCIIHRGKPF QLEALFEANQ NTKNAKIEIK    60
ASIDGLEVDV PGIDPNACHY VKCPLVKGQQ YDIKYTWNVP KIAPKSENVV VTVKVLGDNG   120
VLACAIATHA KIRDPVSNNV ASVRILGSGY ANGSEAHDYI AVSTLNATNQ GFLLADDISN   180
DICSLGADCV IGLGRPKSGR AAFNLPTVME NFVNQDNIAN SFSFHHGRYP DGQHRGVLVL   240
GGTIPAYYRG DFTYVPLVSR ELSFL                                        265

SEQ ID NO: 3            moltype = DNA  length = 19
FEATURE                 Location/Qualifiers
source                  1..19
                        mol_type = other DNA
                        organism = synthetic construct
SEQUENCE: 3
cagctgtttc aacccactg                                                19

SEQ ID NO: 4            moltype = DNA  length = 20
FEATURE                 Location/Qualifiers
source                  1..20
                        mol_type = other DNA
                        organism = synthetic construct
SEQUENCE: 4
cagttctgcc atgcagtttg                                               20

SEQ ID NO: 5            moltype = DNA  length = 20
FEATURE                 Location/Qualifiers
source                  1..20
                        mol_type = other DNA
                        organism = synthetic construct
SEQUENCE: 5
ggccaaccgt gaaaagatga                                               20

SEQ ID NO: 6            moltype = DNA  length = 20
FEATURE                 Location/Qualifiers
source                  1..20
                        mol_type = other DNA
                        organism = synthetic construct
SEQUENCE: 6
cacgctcggt caggatcttc                                               20

SEQ ID NO: 7            moltype = DNA  length = 20
FEATURE                 Location/Qualifiers
source                  1..20
                        mol_type = other DNA
                        organism = synthetic construct
SEQUENCE: 7
agaccagact ccctgtgca                                                20

SEQ ID NO: 8            moltype = DNA  length = 21
FEATURE                 Location/Qualifiers
source                  1..21
                        mol_type = other DNA
                        organism = synthetic construct
SEQUENCE: 8
tgggtcctgt agatggcatt g                                             21

SEQ ID NO: 9            moltype = DNA  length = 24
FEATURE                 Location/Qualifiers
source                  1..24
                        mol_type = other DNA
                        organism = synthetic construct
SEQUENCE: 9
ggccatcagc aacaacataa gcgt                                          24

SEQ ID NO: 10           moltype = DNA  length = 24
FEATURE                 Location/Qualifiers
source                  1..24
                        mol_type = other DNA
                        organism = synthetic construct
SEQUENCE: 10
tgggttgttg acctcaaact tggc                                          24
```

RECOMBINANT LACTIC ACID BACTERIUM AND METHOD THEREOF FOR SIMULTANEOUS TREATMENT AND/OR PREVENTION OF DUST MITE AND COCKROACH ALLERGIES

REFERENCE TO AN ELECTRONIC SEQUENCE LISTING

The content of the electronic sequence listing (2023-06-05 sequence listing.xml; Size: 10,753 bytes; and Date of Creation: Jun. 5, 2023) is herein incorporated by reference in its entirety.

FIELD OF THE INVENTION

The invention relates to a recombinant lactic acid bacterium and a use thereof, and more particularly to a recombinant lactic acid bacterium and a method thereof for simultaneous treatment and/or prevention of dust mite and cockroach allergies.

DESCRIPTION OF THE RELATED ART

The most common inhaled allergens in the environment include dust mites, cockroaches, molds, animal dander, etc., when an individual comes into contact with the above allergens, an allergic reaction will be induced, such as sneezing, nasal congestion, itchy throat, asthma, coughing, which are all symptoms of allergic reactions. Furthermore, dust mites are the most common allergens in the indoor environment, they are commonly found in carpets, beds, curtains, plush toys, etc. Generally speaking, a way to avoid the appearance of dust mites is to maintain the humidity of the indoor environment and maintain ventilation. However, when the indoor environment is maintained at a certain humidity, it may cause physical discomfort or the consequence of breeding other microorganisms. Cockroach is another common allergen in the indoor environment, in addition to being an allergen itself, its corpse or the eggs, bacteria, molds, and feces it carries are also allergens. According to research, cockroaches can induce asthma and other allergic diseases in humans.

At present, most of the prevention and control of indoor allergens is achieved by improving the environment, such as adjusting the humidity of the environment, cleaning bedding regularly, cleaning the environment to reduce the breeding of pests, etc., so that individuals can stay away from allergens as much as possible. However, environmental control is still incapable of completely blocking allergens from contacting the human body, when an allergic reaction occurs, it may cause short-term physical discomfort to the patient in slight cases, or affect life and endanger life in severe cases.

SUMMARY OF THE INVENTION

A main object of the invention is to provide a recombinant lactic acid bacterium obtained by introducing a gene fragment into a lactic acid bacterium through a biotechnology well known in the technical field to which the invention pertains, so that the recombinant lactic acid bacterium is capable of expressing a protein with amino acid sequence coded as SEQ ID No: 2.

Another object of the invention is to provide an anti-allergic use of a recombinant lactic acid bacterium. Specifically, since the recombinant lactic acid bacterium is capable of inducing an individual to produce antibodies against cockroach and/or dust mite allergens, by administering the recombinant lactic acid bacterium disclosed in the invention or a composition containing the recombinant lactic acid bacterium to an individual is capable of effectively achieving an efficacy of preventing and/or treating an allergic disease caused by dust mites and/or cockroaches.

Therefore, in order to achieve the above objects, the invention discloses a recombinant lactic acid bacterium having an exogenous nucleic acid molecule with nucleotide sequence coded as SEQ ID No: 1 to be capable of expressing a heterologous protein with amino acid sequence coded as SEQ ID No: 2.

In one embodiment of the invention, the recombinant lactic acid bacterium is prepared and obtained by a biotechnology well known in the technical field to which the invention pertains, that is, the exogenous nucleic acid molecule is introduced into a lactic acid bacterium through biotransformation technology to obtain the recombinant lactic acid bacterium.

Wherein the lactic acid bacterium is a food-grade lactic acid bacterium or a lactic acid bacterium safe for human body, such as *Lactococcus*.

Since the exogenous nucleic acid molecule with nucleotide sequence coded as SEQ ID No: 1 is an artificially designed sequence, the exogenous nucleic acid molecule mainly comprises main sequences of the dust mite allergen Der p 2 and the American cockroach allergen Per a 2, so the heterologous protein expressed by the recombinant lactic acid bacterium disclosed in the invention is capable of inducing simultaneous production of antibodies against cockroach allergens and dust mite allergens in the individual's body, thereby capable of effectively achieving an efficacy of treating and/or preventing an allergic disease caused by cockroach allergens and/or dust mite allergens.

In one embodiment of the invention, the allergic disease is a disease related to skin allergies or tracheal allergies.

In another embodiment of the invention, a method for treating or preventing an allergic disease is disclosed, which means that by administering an effective amount of the recombinant lactic acid bacterium disclosed in the invention or a composition containing the recombinant lactic acid bacterium to an individual is capable of inducing production of antibodies against dust mite and/or cockroach allergens in the individual's body to effectively improve and/or prevent an allergic disease such as asthma or atopic dermatitis caused by cockroach allergens and/or dust mite allergens.

In one embodiment of the invention, the composition is a food, a vaccine, or a nutritional supplement.

DETAILED DESCRIPTION OF THE INVENTION

Figure 1A:
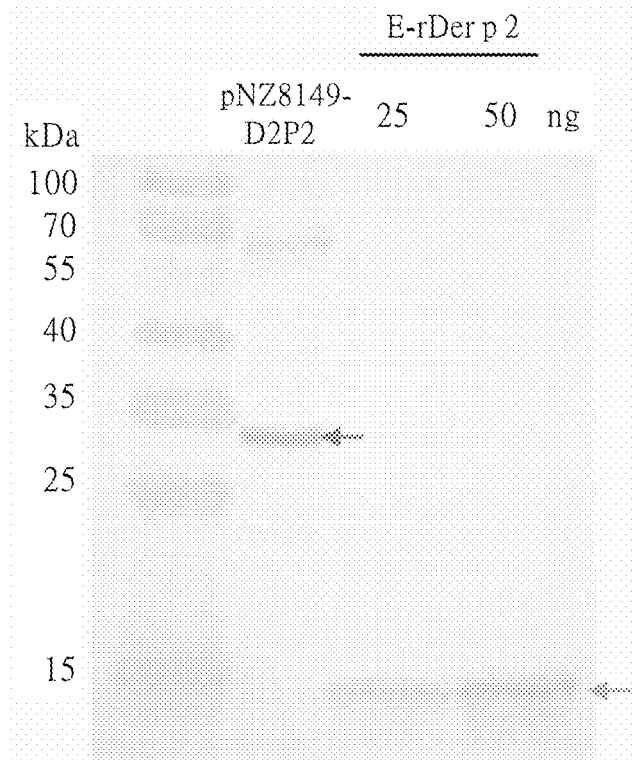
FIG. 1A is the result of analyzing the protein expression of recombinant D2P2 *Lactococcus* using anti-Der p 2 polyclonal antibody by Western blot, in which the arrow is the band of D2P2 protein.

The invention discloses a recombinant lactic acid bacterium and a method thereof for simultaneous treatment and/or prevention of dust mite and cockroach allergies, wherein the recombinant lactic acid bacterium is capable of expressing the D2P2 protein with amino acid sequence of SEQ ID No: 2, the D2P2 protein is capable of inducing an individual's body to produce antibodies against dust mite and/or cockroach allergens, and therefore, by administering an effective amount of the recombinant lactic acid bacterium disclosed in the invention to the individual is capable of effectively causing the individual's body to produce antibodies against dust mite and/or cockroach allergens, thereby achieving an efficacy of preventing and/or treating an allergic disease caused by dust mite and/or cockroach allergens.

In one embodiment of the invention, the recombinant lactic acid bacterium disclosed in the invention uses a food-grade lactic acid bacterium as an expression carrier, and is obtained by introducing a gene fragment with nucleotide sequence coded as SEQ ID No: 1 into a genome of the food-grade lactic acid bacterium through a biotechnology.

Wherein the gene fragment with nucleotide sequence coded as SEQ ID No: 1 disclosed in the invention is artificially designed, and comprises the main sequence of the dust mite allergen Der p 2 and the main sequence of the American cockroach allergen Per a 2; the gene fragment with nucleotide sequence coded as SEQ ID No: 1 can be translated into the D2P2 protein with amino acid sequence coded as SEQ ID No: 2 to be capable of being used as an antigen to induce production of antibodies against dust mite allergens and/or American cockroach allergens in the individual's body.

Since the recombinant lactic acid bacterium disclosed in the invention is capable of expressing the D2P2 protein with amino acid sequence of SEQ ID No: 2, by administering a predetermined amount of the recombinant lactic acid bacterium disclosed in the invention to an individual is capable of inducing an immunoreaction in the individual to cause production of antibodies against dust mite allergens and cockroach allergens in the individual's body in order to effectively improve an allergic disease such as atopic dermatitis or asthma caused by dust mite and/or cockroach allergens.

The recombinant lactic acid bacterium disclosed in the invention can be used as a food, a pharmaceutical composition or a health food; for example, the recombinant lactic acid bacterium can be used as an oral vaccine, by quantitatively administering the recombinant lactic acid bacterium to an individual is capable of delivering an antigen composed of dust mite allergens and cockroach allergens to the individual's body to induce production of antibodies against dust mite allergens and cockroach allergens in the individual's body.

The term "allergic disease" in the invention refers to a skin disease and/or a respiratory disease caused by an allergen, such as atopic dermatitis, skin inflammation, asthma, bronchitis, etc.

The "allergen" referred to in the invention refers to dust mites, cockroaches or allergy-causing substances from dust mites and/or cockroaches, which can induce the immune response.

"Atopic dermatitis" disclosed in the invention is a skin allergy disease characterized by intense itching and recurrent eczema skin lesions, and is mainly caused by cockroaches or dust mites in an environment. At present, the main clinical treatment methods are to apply emollients to an affected area locally, avoid contact with specific allergens (food or inhalation), or use anti-inflammatory drugs such as corticosteroids and calcineurin inhibitors.

The "food-grade lactic acid bacterium" disclosed in the invention refers to lactic acid bacterium and *Lactococcus* that are considered to be safe for consumption after evaluation, such as *Lactococcus* strain NZ3900. In general, the food-grade lactic acid bacterium should meet the following conditions:

does not contain non-food-grade functional DNA fragments, such as genes coded as antibiotics;

the lactic acid bacterium will not change an intestinal flora after entering a human digestive tract; and an inducer used for the lactic acid bacterium must also be food grade, such as nisin.

The term "administrating" or "administration" in the invention refers to a means of providing an effective amount of the recombinant lactic acid bacterium disclosed in the invention or a composition containing the recombinant lactic acid bacterium to an individual, including injection, oral administration, transdermal absorption, etc.

The "composition" referred to in the invention is a substance containing an effective amount of the recombinant lactic acid bacterium disclosed in the invention, and can be matched with different components according to factors such as use, dosage form, and administration object. For example, the composition is an oral vaccine, a food, or a nutritional supplement.

The "effective amount" in the invention refers to an amount that is capable of treating, preventing, alleviating, and improving a predetermined disease or symptom in an individual. Generally speaking, the effective amount accounts for 0.001-100% of a total weight of the composition.

In the following, in order to illustrate the technical features and efficacies of the invention, several examples are provided in conjunction with the drawings for detailed description as follows.

"*Escherichia coli* expressing Per a 2 recombinant protein (short form as Per a 2 recombinant protein, abbreviated as E-rPer a 2)" and "*Escherichia coli* expressing Der p 2 recombinant protein (short form as Der p 2 recombinant protein, abbreviated as E-rDer p 2)" used in the following examples, are purified by rapid affinity column chromatography (Novagen, Darmstadt, Germany) disclosed in the references.

Animal experiments performed in the following examples are approved by La-1101826 of the Institutional Animal Care and Use Committee (IACUC).

The drug: Dexamethasone used in the following examples is a steroid drug currently recommended clinically for treatment of moderate or severe asthma.

Statistical data in the following examples, unless otherwise specified, are a tool for statistical analysis using SPSS software. When p value is less than 0.05, it is considered to have a significant difference.

Example 1: Construction of Recombinant *Lactococcus*

After cloning a gene fragment with nucleotide sequence coded as SEQ ID No: 1 into the Ncol/Xbal site of the pNZ8149 vector, the gene fragment is purified to obtain a constructed recombinant plasmid (hereinafter referred to as pNZ8149-D2P2 plasmid), wherein the recombinant plasmid is capable of expressing the gene fragment by regulating the promoter nisA. The purified recombinant plasmid is transformed into the *Lactococcus* strain NZ3900 to obtain a recombinant D2P2 *Lactococcus*.

Figure 1B:
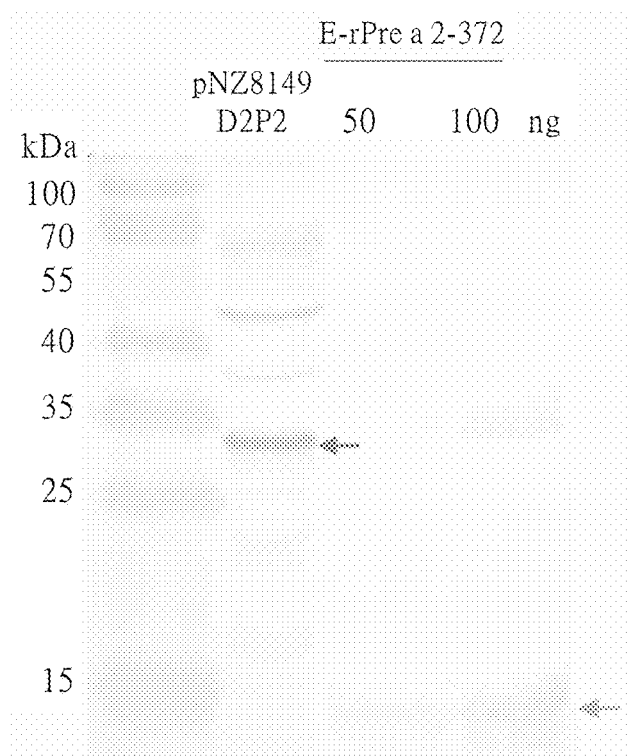
FIG. 1B is the result of analyzing the protein expression of recombinant D2P2 *Lactococcus* using anti-Per a 2-372 polyclonal antibody by Western blot, in which the arrow is the band of D2P2 protein.

The recombinant D2P2 *Lactococcus* is cultured to OD600 of 0.2, and induced with nisin, dose 40 ng/ml for 5 hours, and then analyzed by SDS-PAGE and immunoassay (using anti-Per a 2-372 polyclonal antibody or anti-Der p 2 polyclonal antibody) to observe protein expression, the results are shown in FIG. 1A and FIG. 1B.

From the results in FIG. 1A and FIG. 1B, it can be known that the recombinant D2P2 *Lactococcus* is reliably capable of expressing the D2P2 protein (amino acid sequence coded as SEQ ID No: 2) with a molecular weight of 28.5-KDa under induction of the inducer nisin.

Example 2: Animal Experiments

Take several 6-week-old female BALB/c mice, remove back hair of each of the mice, and randomly divide them into experimental group I and experimental group II, and experimental group I and experimental group II are treated according to contents in the following table 1 and table 2 respectively during an experimental period. The experimental period is 8 weeks. An allergen of experimental group I is Per a 2 recombinant protein, and an allergen of experimental group II is Der p 2 recombinant protein, wherein skin sensitization treatment is carried out in the first week (days 1-7), the 4th week (days 21-28) and the 7th week (days 42-49) of the experiment; in weeks 2-8 (on days 8-55) of the experiment, treatment strategy is given at a frequency of 5 days a week; on days 50, 53 and 55 of the experiment, the mice are administered with allergens intradermally (abbreviated as ID) and intratracheally (abbreviated as IT).

During the experimental period, serum of the mice in each group in each of the experimental groups is collected every 2 weeks; on the 55th day of the experiment, scratching behavior of the mice in each group in each of the experimental groups is analyzed after intradermal injection of allergens; on the 56th day of the experiment, airway hyperresponsiveness (AHR) is carried out; on the 57th day of the experiment, the mice in each group in each of the experimental groups are sacrificed, and skin, nose, spleen, lung of each of the mice are taken for further follow-up analysis and research.

TABLE 1

Skin sensitization treatment, treatment strategy and challenge treatment of the mice in each group in experimental group I

| Group | Skin sensitization (Patch 100 μl/time) | Treatment strategy (IG 200 μl or SC 100 μl) | Challenge treatment (ID 20 μl + IT50 μl) |
|---|---|---|---|
| Group 1-1 | Phosphate buffer | Intragastrically (IG for short) phosphate buffer solution, 5 days a week, 200 μl each time | None |

TABLE 1-continued

Skin sensitization treatment, treatment strategy and challenge treatment of the mice in each group in experimental group I

| Group | Skin sensitization (Patch 100 μl/time) | Treatment strategy (IG 200 μl or SC 100 μl) | Challenge treatment (ID 20 μl + IT50 μl) |
|---|---|---|---|
| Group 1-2 | 50 μg of Per a 2 recombinant protein | Intragastrically (IG for short) phosphate buffer solution, 5 days a week, 200 μl each time | ID: 1 μg Per a 2 recombinant protein IT: 5 μg Per a 2 recombinant protein |
| Group 1-3 | 50 μg of Per a 2 recombinant protein | Subcutaneously (SC for short) dexamethasone, dose 2.5 mg/ml, 2 times a week, 6 times in total | ID: 1 μg Per a 2 recombinant protein IT: 5 μg Per a 2 recombinant protein |
| Group 1-4 | 50 μg of Per a 2 recombinant protein | Intragastrically the recombinant Lactococcus disclosed in the invention (prepared in Example 1), which contains 2 μg of D2P2 protein (200 μl each time) | ID: 1 μg Per a 2 recombinant protein IT: 5 μg Per a 2 recombinant protein |

TABLE 2

Skin sensitization treatment, treatment strategy and challenge treatment of the mice in each group in experimental group II

| Group | Skin sensitization (Patch 100 μl/time) | Treatment strategy (IG 200 μl or SC 100 μl) | Challenge treatment (ID 20 μl + IT50 μl) |
|---|---|---|---|
| Group 2-1 | Phosphate buffer | Intragastrically (IG for short) phosphate buffer solution, 5 days a week, 200 μl each time | None |
| Group 2-2 | 50 μg of Der a 2 recombinant protein | Intragastrically (IG for short) phosphate buffer solution, 5 days a week, 200 μl each time | ID: 1 μg Der p 2 recombinant protein IT: 5 μg Der p 2 recombinant protein |
| Group 2-3 | 50 μg of Der a 2 recombinant protein | Intragastrically the recombinant Lactococcus disclosed in the invention (prepared in Example 1), which contains 2 μg of D2P2 protein (200 μl each time) | ID: 1 μg Der p 2 recombinant protein IT: 5 μg Der p 2 recombinant protein |

Example 3: Total IgE Analysis in Serum

Figure 2A:
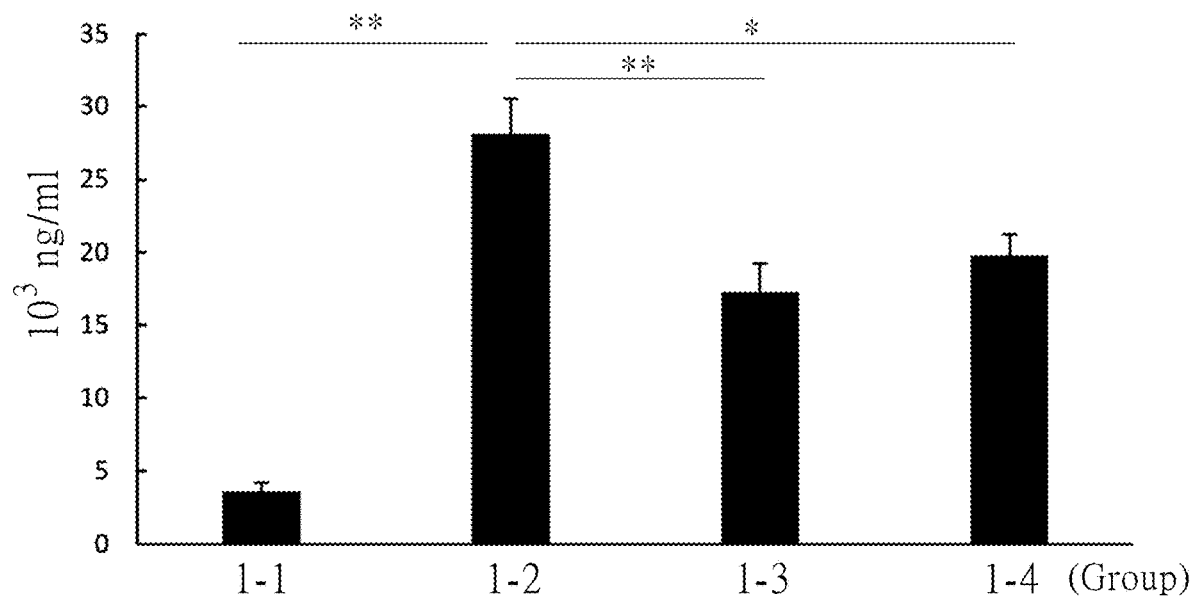
FIG. 2A is the result of statistical analysis of the total amount of IgE antibody in the serum of mice in each group in the experimental group I, in which represents $p<0.05$, and "**" represents $p<0.01$ in the figure.
Figure 2B:
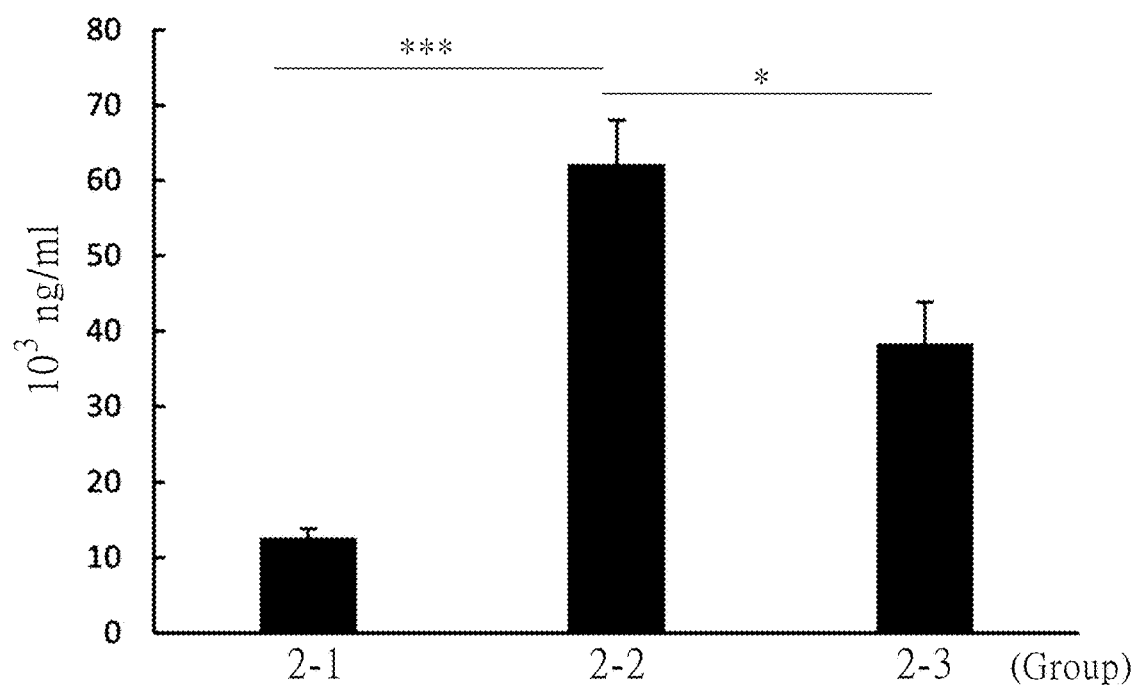
FIG. 2B is the result of statistical analysis of the total amount of IgE antibody in the serum of mice in each group in the experimental group II, in which represents p<0.05, "" represents p<0.01, and "*" represents p<0.001 in the figure.

Serum of the mice in each group in each of the experimental groups in Example 2 is collected, and a content of IgE antibody in the serum is detected with a commercially available ELISA kit (IgE mouse ELISA kit, Invitrogen). The results are shown in FIG. 2A and FIG. 2B. From the results of FIG. 2A and FIG. 2B, it can be known that total amounts of IgE antibody in the serum of the mice in group 1-2 and group 2-2 are higher than total amounts of IgE antibody in the serum of the mice in the negative control group (group 1-1 and group 2-1) respectively, total amounts of IgE antibody are increased significantly, indicating that skin sensitization is successful; based on the fact that a total amount of IgE antibody in the serum of the mice in group 1-4 is significantly lower than a total amount of IgE antibody in the serum of the mice in group 1-2, and a total amount of IgE antibody in the serum of the mice in group 2-3 is also lower than a total amount of IgE antibody in the serum of the mice in group 2-2, showing that the recombinant Lactococcus disclosed by the invention is capable of reliably reducing IgE antibody induced by dust mite allergens and cockroach allergens.

Example 4: Analysis of Scratching Behavior

Figure 3A:
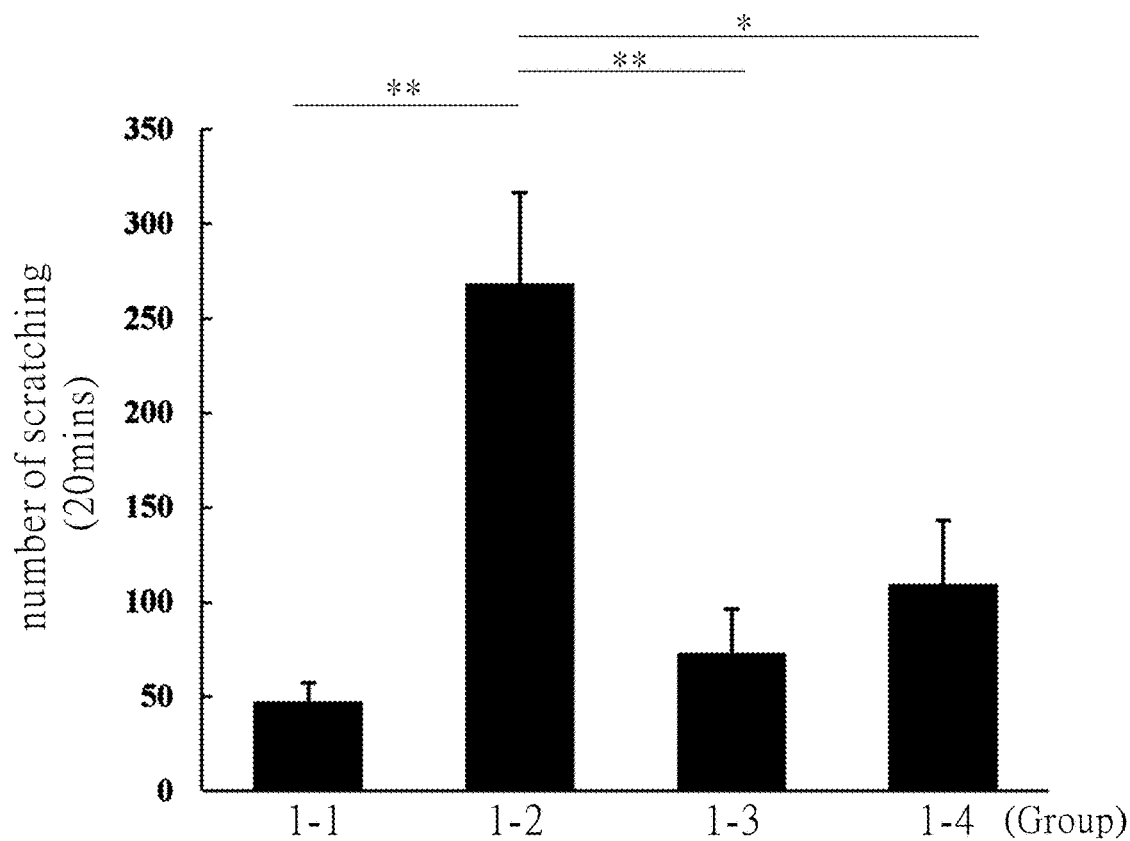
FIG. 3A is the statistical analysis of the number of scratching of mice in each group in the experimental group I, in which "*" represents p<0.05, and "**" represents p<0.01 in the figure.
Figure 3B:
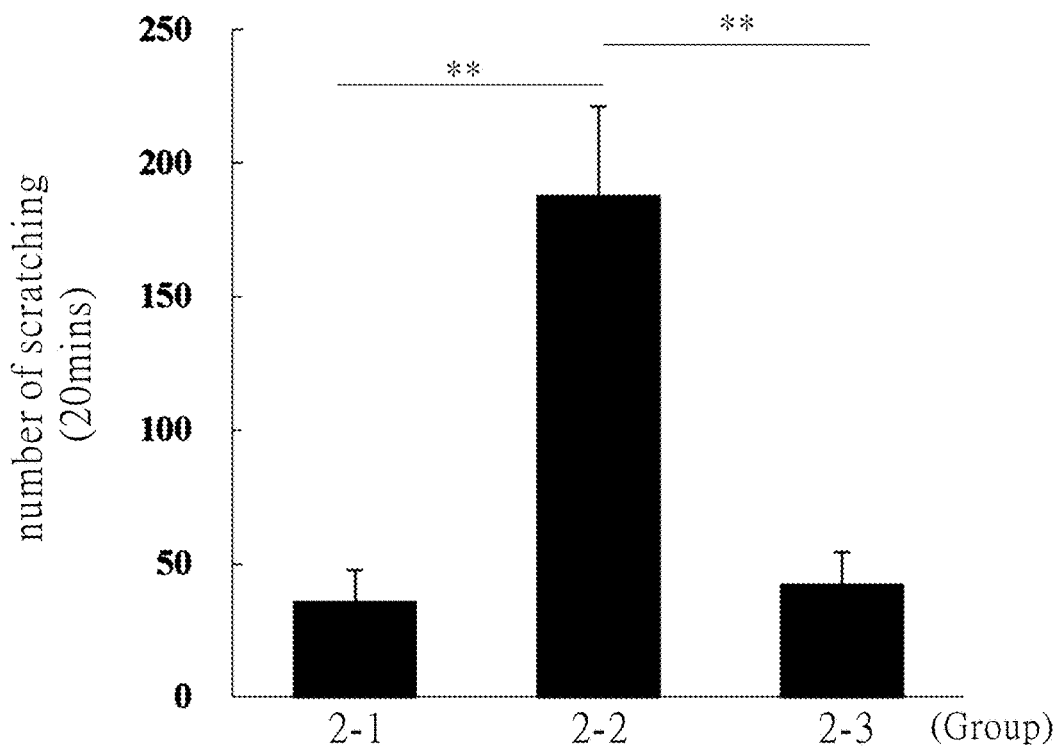
FIG. 3B is the statistical analysis of the number of scratching of mice in each group in the experimental group II, in which "**" represents p<0.01 in the figure.

Each of the experimental groups of Example 2 is carried out with treatment intradermally on the 55th day of the experiment, the mice of each group in each of the experimental groups are recorded for 1 hour by video, and number of times of scratching of the mice of each group within the 1 hour are statistically analyzed, the results are shown in FIG. 3A and FIG. 3B. From the results of FIG. 3A and FIG. 3B, it can be known that due to the success of skin sensitization, number of times of scratching of the mice in group 1-2 and group 2-2 are significantly more than those of the mice in the negative control group, and number of times of scratching of the mice in group 1-4 and group 2-3 administered with the recombinant Lactococcus disclosed in the invention are significantly lower than those of the mice in group 1-2 and group 2-2, respectively, showing that the recombinant Lactococcus disclosed by the invention is capable of effectively inhibiting discomfort symptoms caused by skin allergies, such as itching, rash, etc.

Example 5: Analysis of Skin Symptoms of Atopic Dermatitis

Figure 4A:
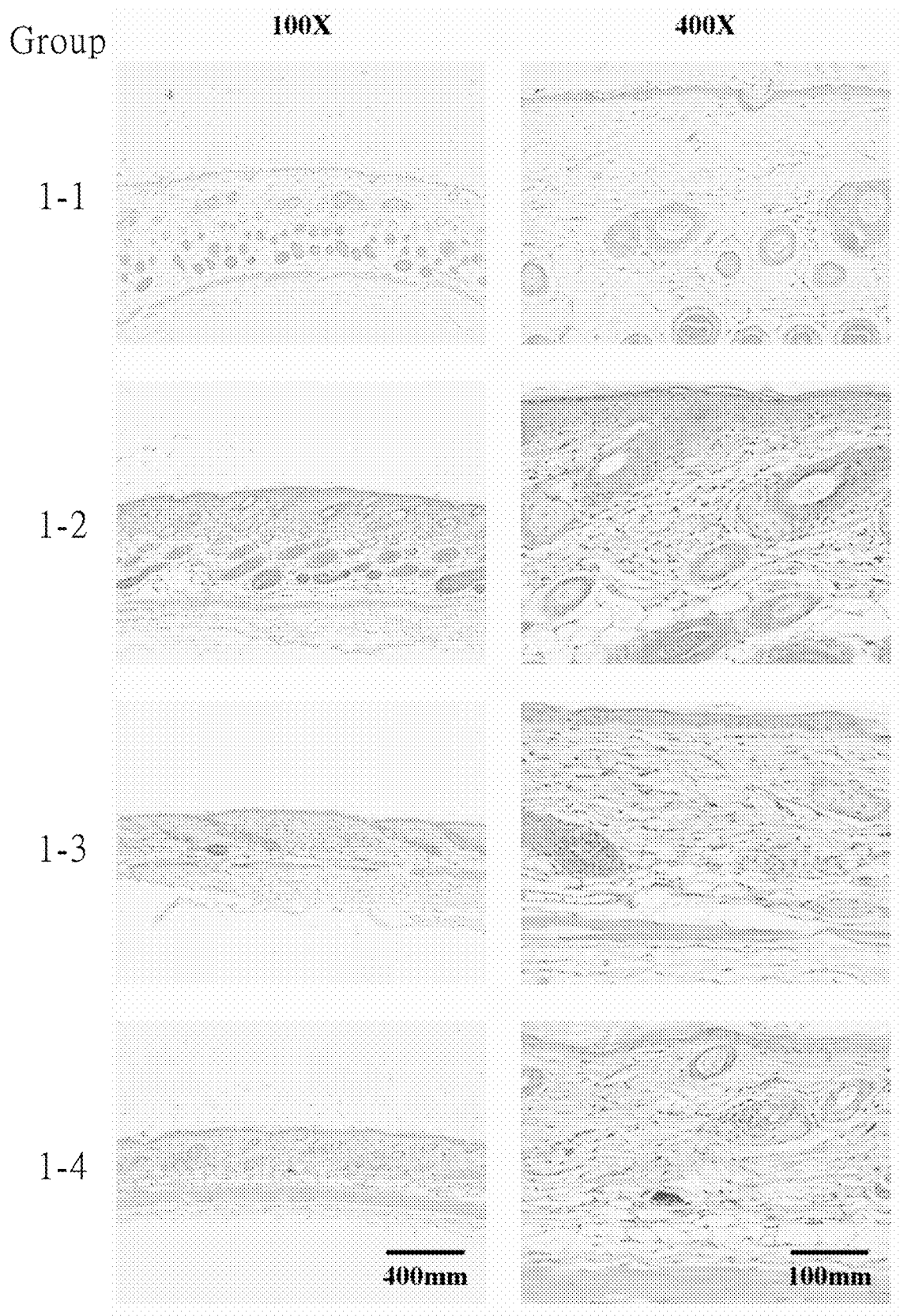
FIG. 4A is the result of H&E staining of the skin tissue sections of mice in each group in the experimental group I under different magnifications.
Figure 4B:
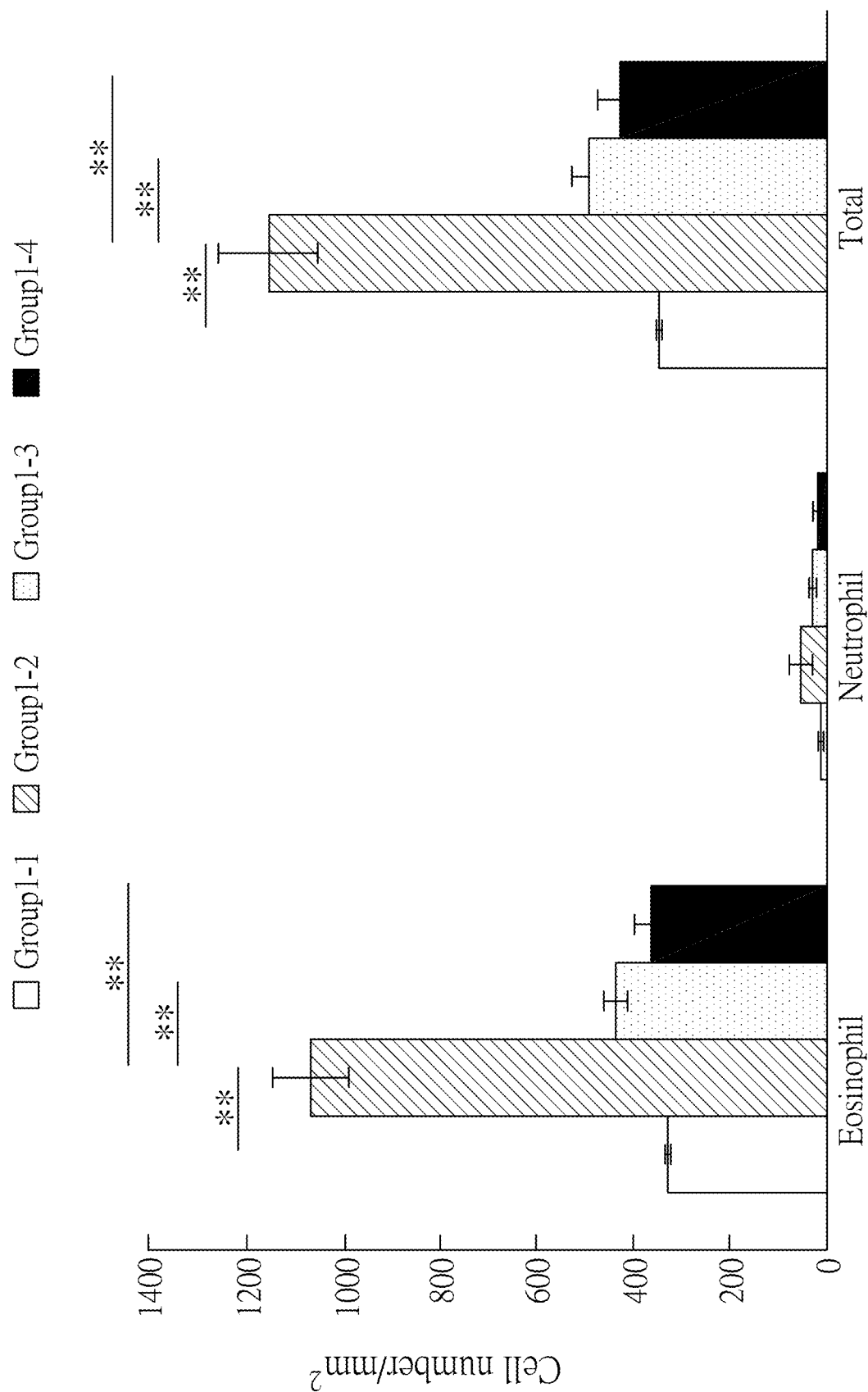
FIG. 4B is the result of statistical analysis of the number of inflammatory cells in the skin tissue sections of mice in each group in the experimental group I, in which "**" represents p<0.05 in the figure.
Figure 5A:
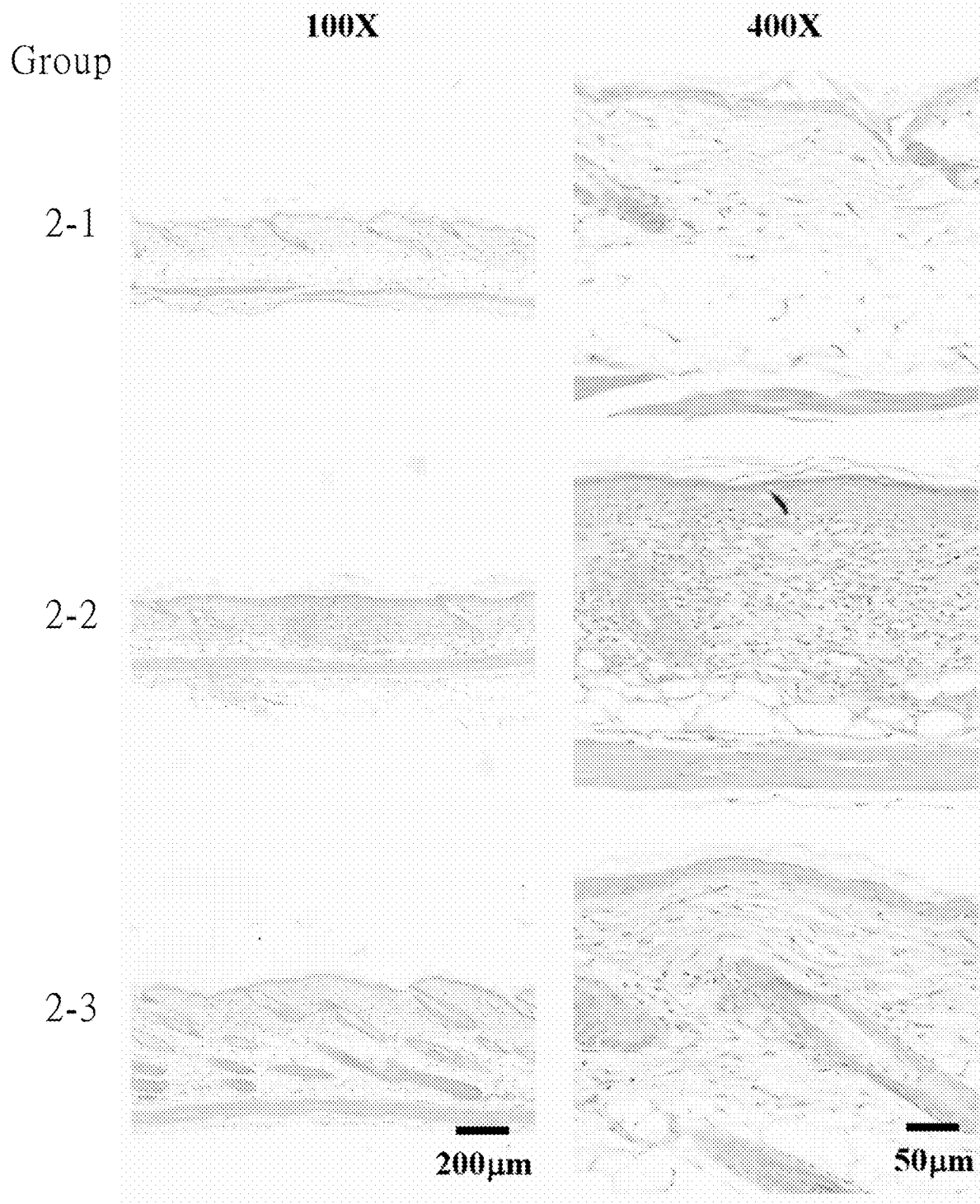
FIG. 5A is the result of H&E staining of the skin tissue sections of mice in each group in the experimental group II under different magnifications.
Figure 5B:
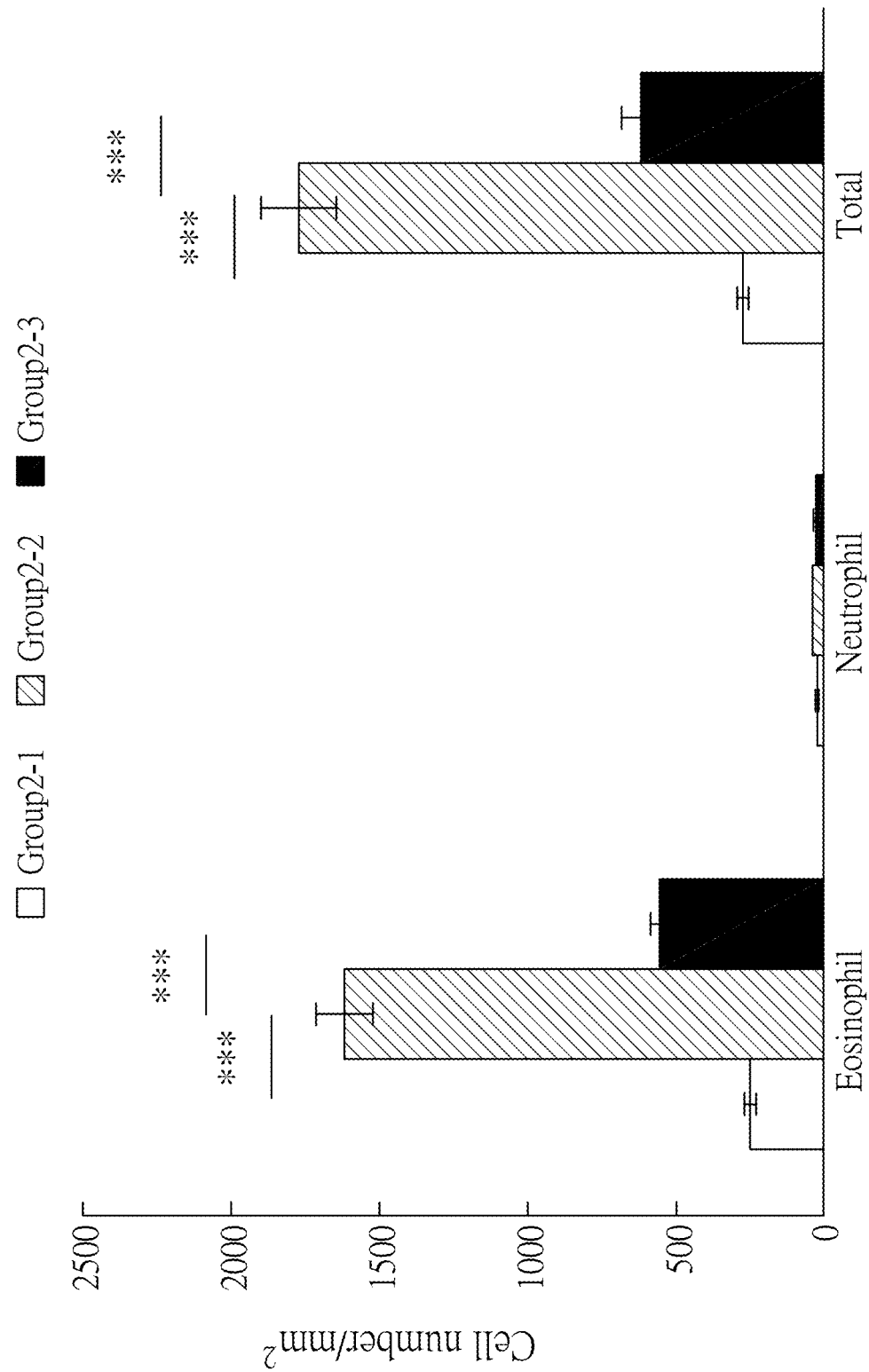
FIG. 5B is the result of statistical analysis of the number of inflammatory cells in the skin tissue sections of mice in each group in the experimental group II, in which "***" represents p<0.001 in the figure.
Figure 6A:
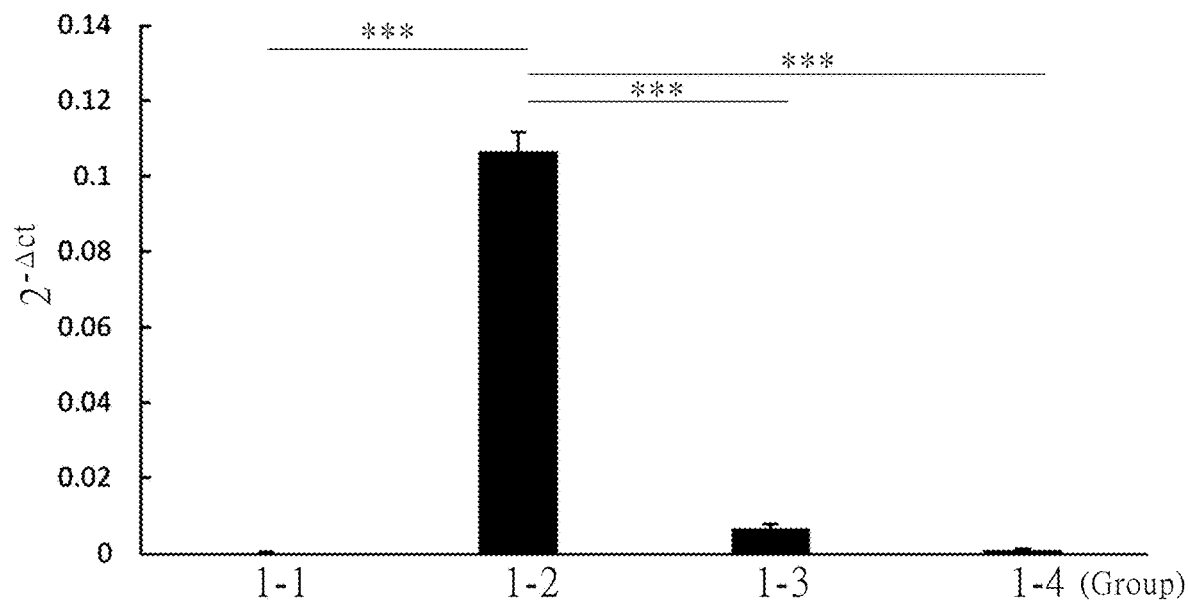
FIG. 6A is the result of statistical analysis of IL-31 expression levels in the damaged skin tissues of mice in each group in the experimental group I, in which "***" represents p<0.001 in the figure.
Figure 6B:
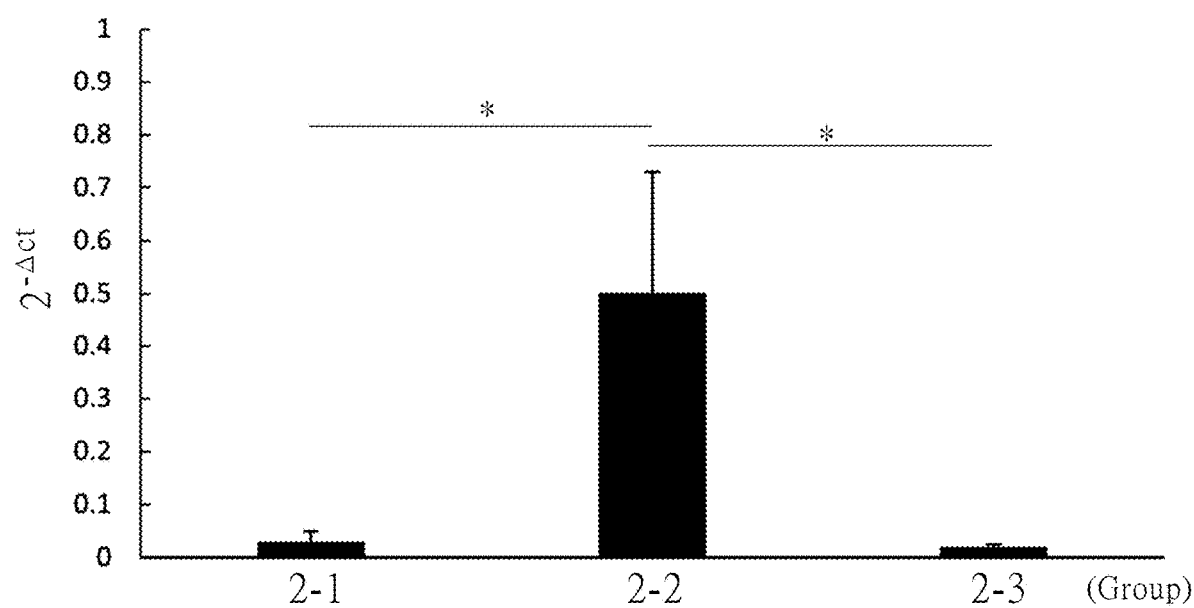
FIG. 6B is the result of statistical analysis of IL-31 expression levels in the damaged skin tissues of mice in each group in the experimental group II, in which "*" represents p<0.05 in the figure.

After the experiment, skin tissues of the mice in each group of each of the experimental groups in Example 2 are taken, tissue sections and then H&E staining analysis are performed, and a number of inflammatory cells is statistically analyzed, as shown in FIG. 4 and FIG. 5. Further, total RNA in damaged tissues of damaged skin of the mice in each group is extracted with TRIzol reagent (Thermo Fisher Scientific, MA, USA), and cDNA is synthesized with SuperScript III kit (Invitrogen CA, USA). Then quantitative PCR is carried out by StepOnePlus system (Applied Biosystems, CA, USA) to analyze an expression level of the inflammation-related factor: IL-31 in the damaged skin of the mice in each group, wherein primer pairs used are shown in Table 3 below, the expression levels of IL-31 in the damaged skin tissues of the mice in each group are shown in FIG. 6A and FIG. 6B.

TABLE 3

List of primer pairs

| Name | Sequence number |
|---|---|
| IL-31 forward primer | SEQ ID No: 3 |
| IL-31 reverse primer | SEQ ID No: 4 |
| β-actin forward primer | SEQ ID No: 5 |
| β-actin reverse primer | SEQ ID No: 6 |

From the results in FIG. 4 to FIG. 6, it can be known that compared with the mice in group 1-1 and group 2-1, the skin tissues of the mice in group 1-2 and group 2-2 have obvious cellular infiltration and inflammatory reaction respectively, showing that dust mite or cockroach allergens are capable of reliably inducing symptoms of atopic dermatitis in the mice through skin sensitization. Compared with the mice in group 1-2 and group 2-2, skin tissue cellular infiltration of the mice in group 1-4 and group 2-3 is significantly reduced, eosinophil and total number of cells are significantly reduced, and IL-31 is not overexpressed in the skin tissues; and cellular infiltration and inflammation in the skin tissues of the mice in group 1-4 and group 2-3 are similar to those of the mice in group 1-3 administered with steroid.

The above results show that the recombinant *Lactococcus* disclosed in the invention is capable of reliably expressing the D2P2 protein with amino acid sequence of SEQ ID No: 2 in the individual's body, and effectively achieving an efficacy of resisting skin allergies caused by dust mite or cockroach allergens, such as atopic dermatitis.

Example 6: Analytical Results of Respiratory Hyperresponse

Figure 7A:
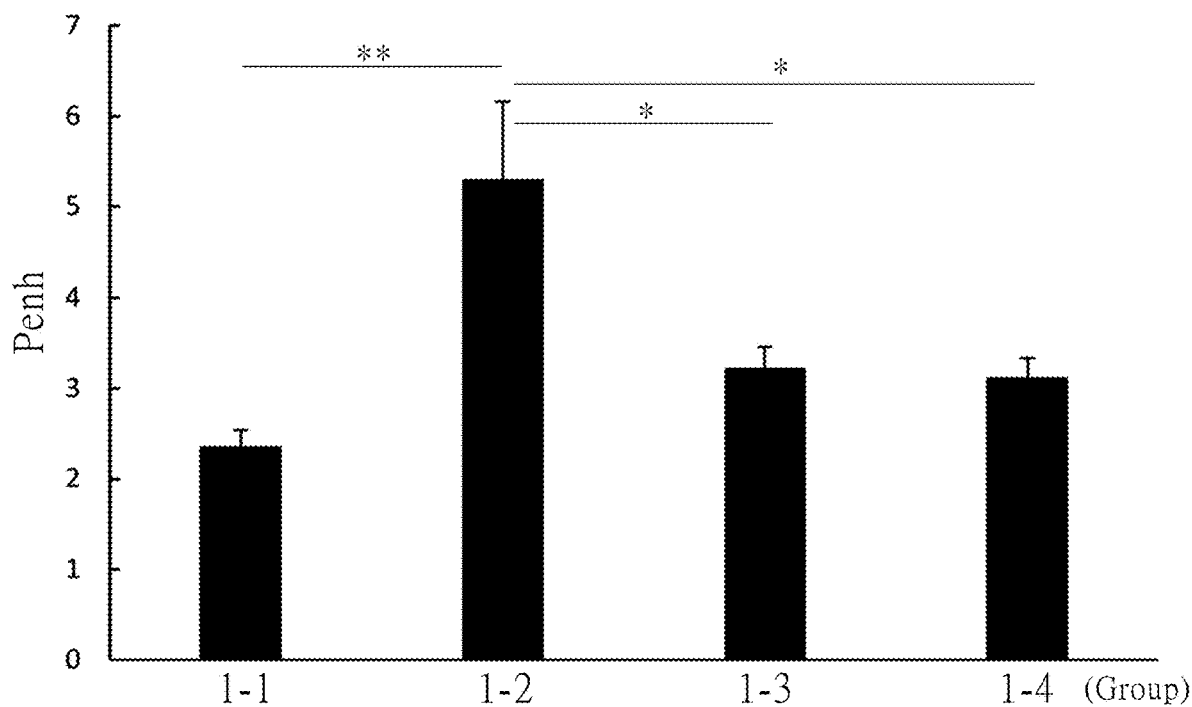
FIG. 7A is the result of statistical analysis of Penh values of mice in each group in the experimental group I, in which "*" represents p<0.05, and "**" represents p<0.01 in the figure.
Figure 7B:
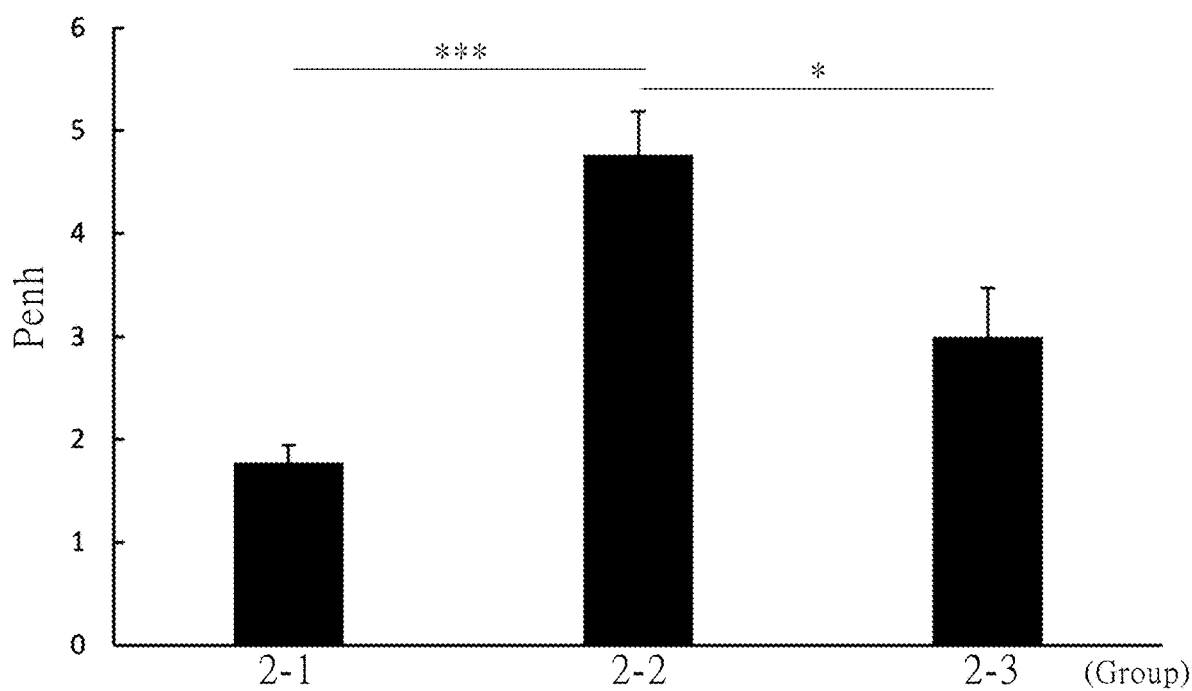
FIG. 7B is the result of statistical analysis of Penh values of mice in each group in the experimental group II, in which "*" represents p<0.05, and represents p<0.001 in the figure.

After the mice in each group in each of the experimental groups of Example 2 accepted a last intratracheal challenge experiment, average values of degree of bronchoconstriction of the mice in each group are measured (measurement time is 3 minutes), wherein data are expressed in Pehh (enhanced pause) value, calculation method of Pehh value is shown in formula (I) below, and statistical analysis results of Penh value of the mice in each group in each of the experimental groups are shown in FIG. 7A and FIG. 7B.

$$Penh = \text{expiratory time} \times (\text{peak expiratory pressure } (PEP)/\text{peak respiratory pressure } (PIP)) \text{ of the mice in each group} \quad \text{formula (I)}$$

Figure 8A:
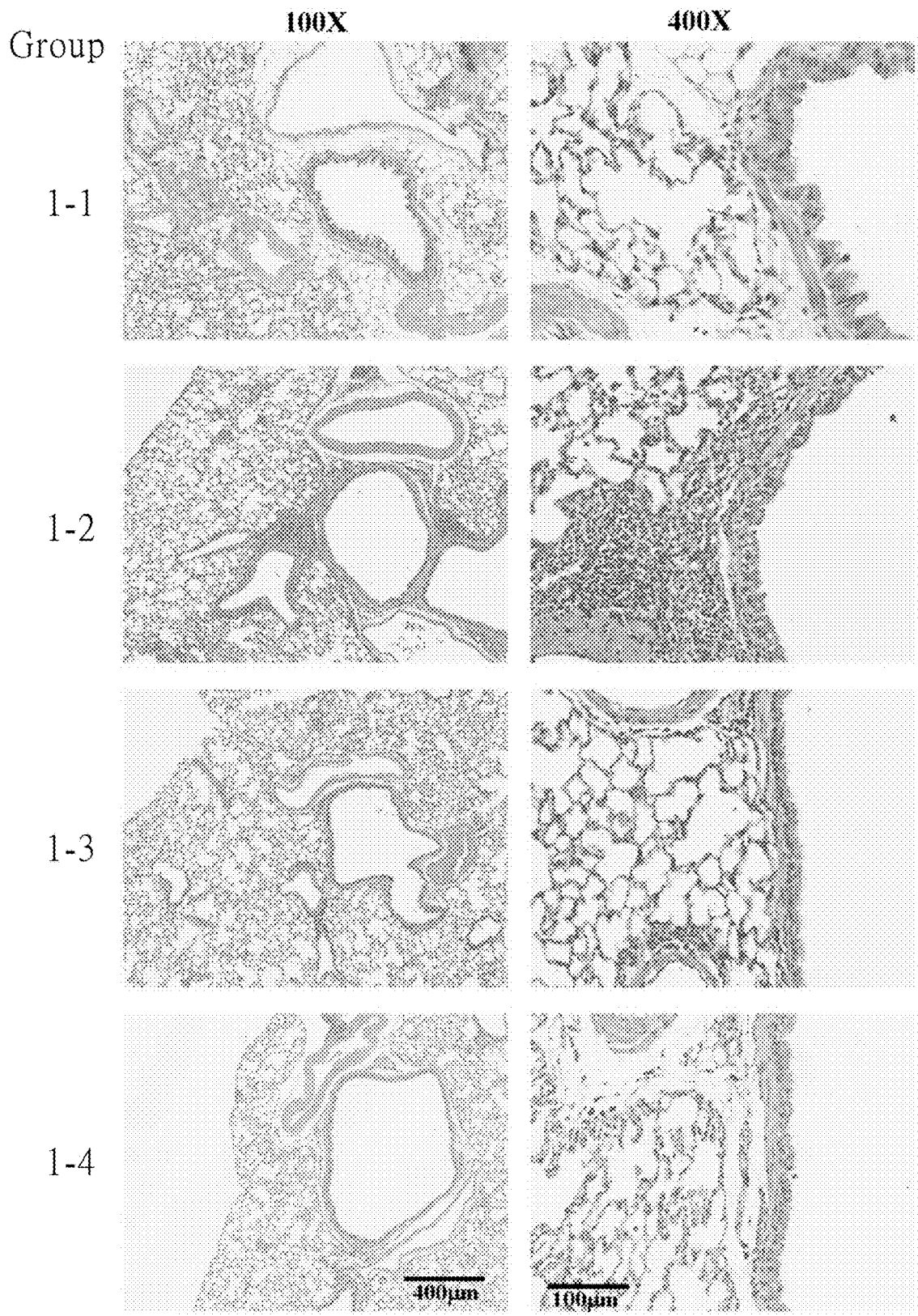
FIG. 8A is the result of H&E staining of the lung tissue sections of mice in each group in the experimental group I under different magnifications.
Figure 8B:
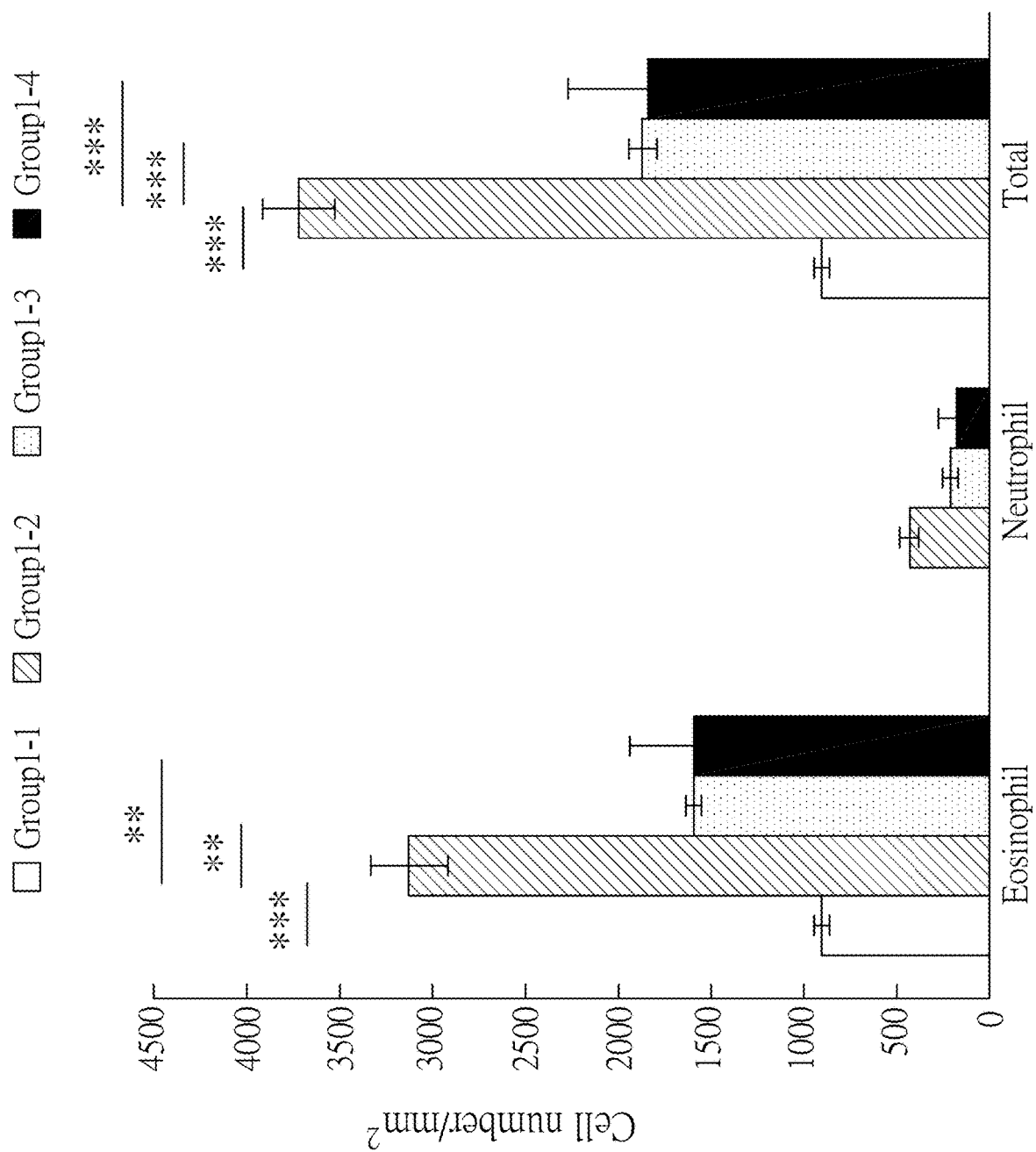
FIG. 8B is the result of statistical analysis of the number of inflammatory cells in the lung tissue sections of mice in each group in the experimental group I, in which "" represents p<0.01, and "*" represents p<0.001 in the figure.
Figure 9A:
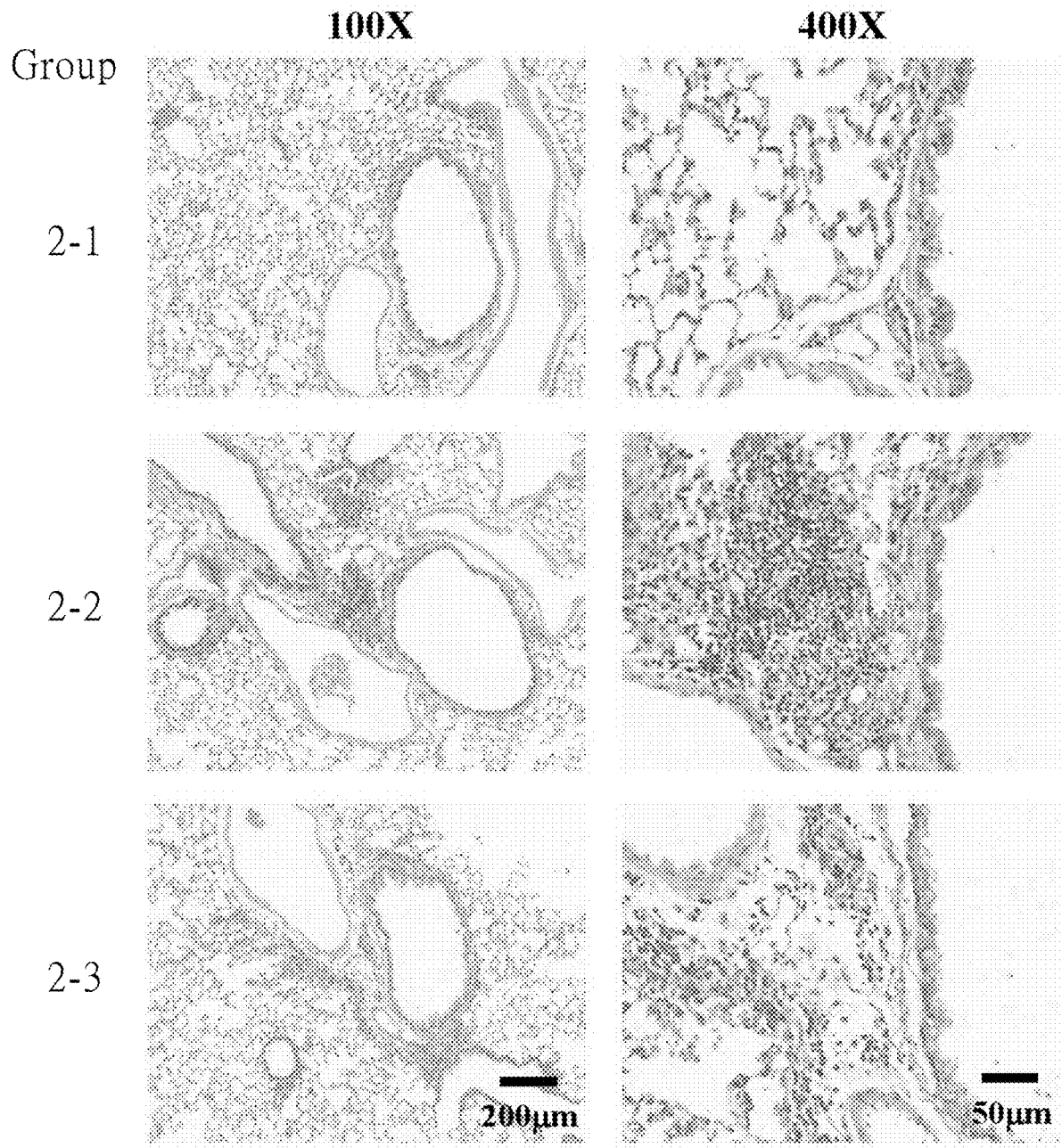
FIG. 9A is the result of H&E staining of the skin tissue sections of mice in each group in the experimental group II under different magnifications.
Figure 9B:
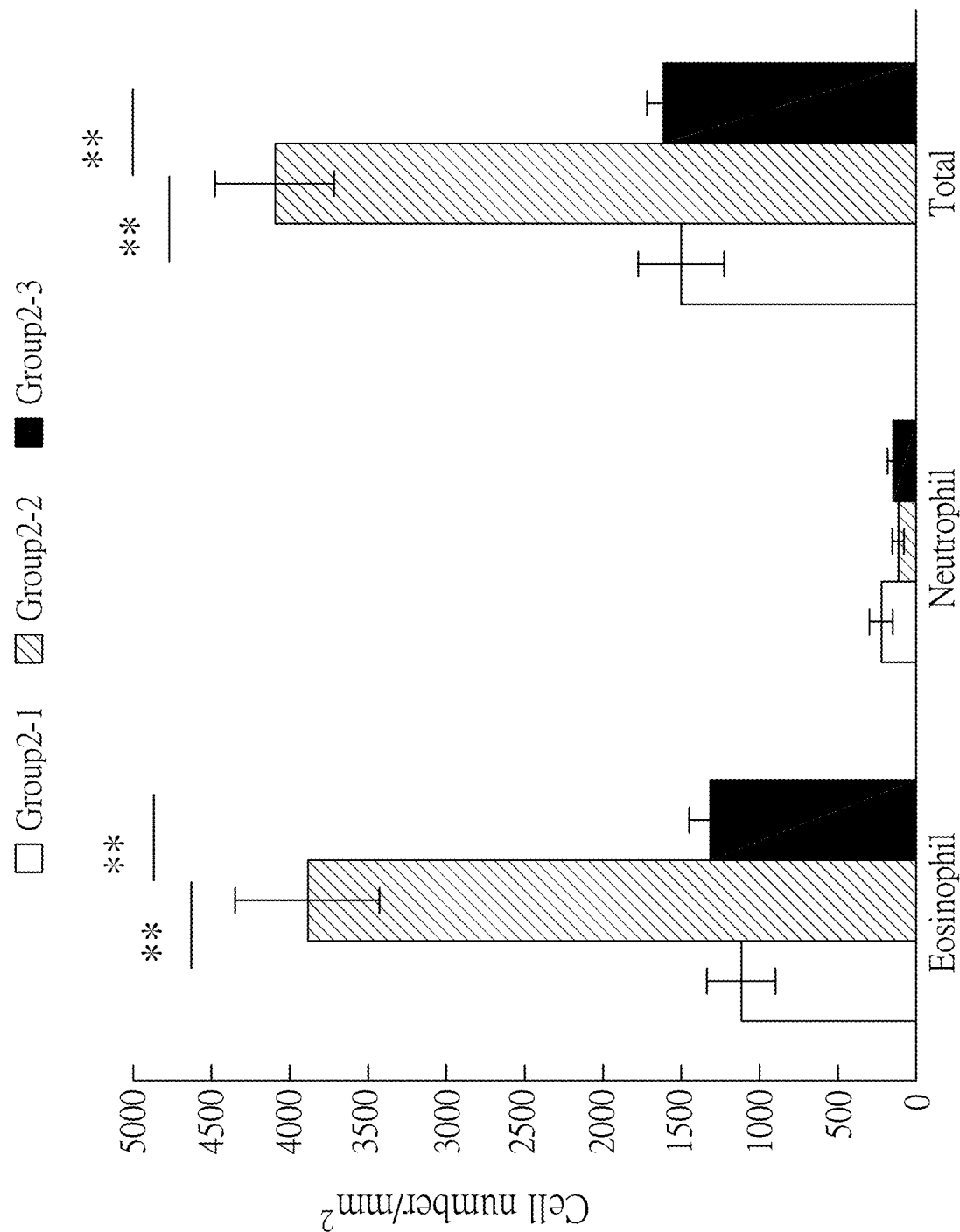
FIG. 9B is the result of statistical analysis of the number of inflammatory cells in the lung tissue sections of mice in each group in the experimental group II, in which "**" represents p<0.01 in the figure.
Figure 10A:
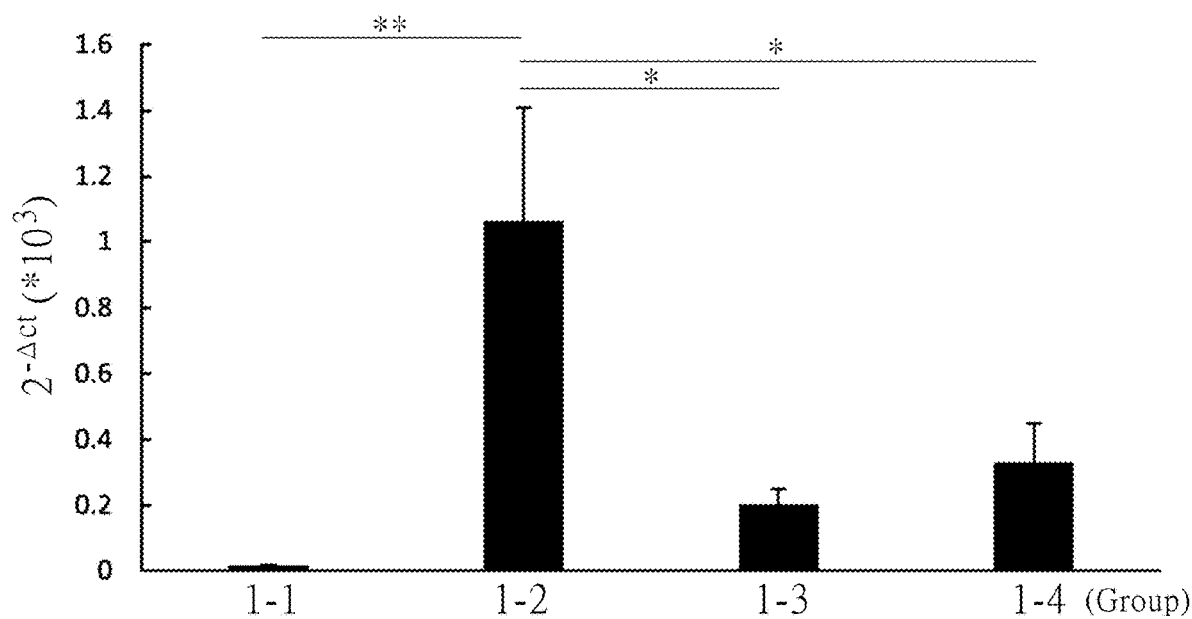
FIG. 10A is the result of statistical analysis of IL-31 expression levels in the lung tissues of mice in each group in the experimental group I, in which represents p<0.05, and "**" represents p<0.01 in the figure.
Figure 10B:
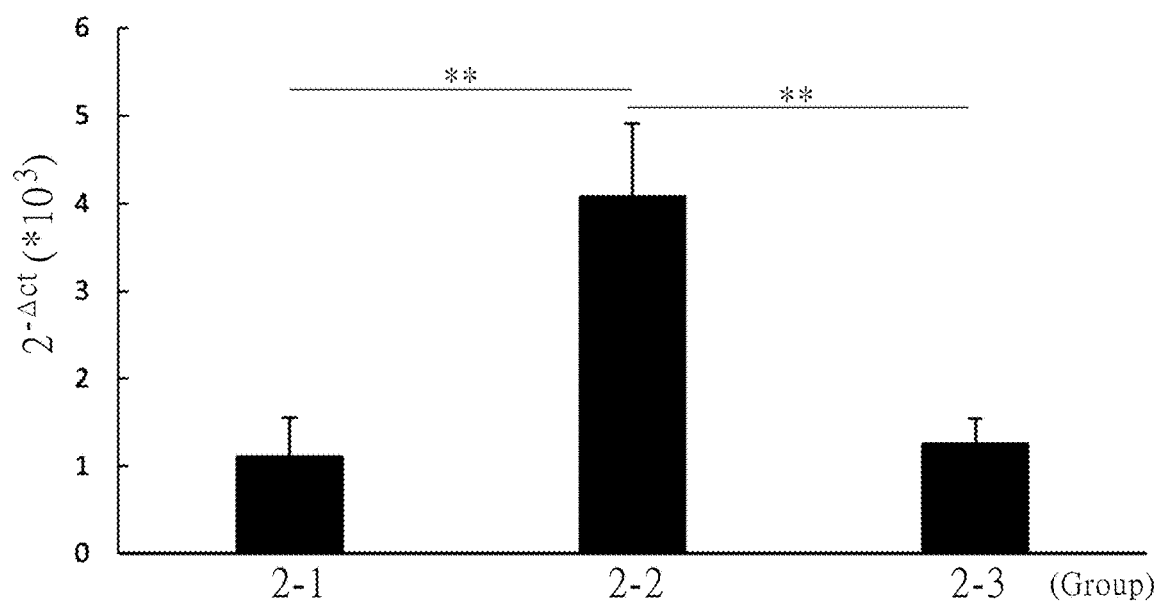
FIG. 10B is the result of statistical analysis of IL-31 expression levels in the lung tissues of mice in each group in the experimental group II, in which "**" represents p<0.01 in the figure.
Figure 11A:
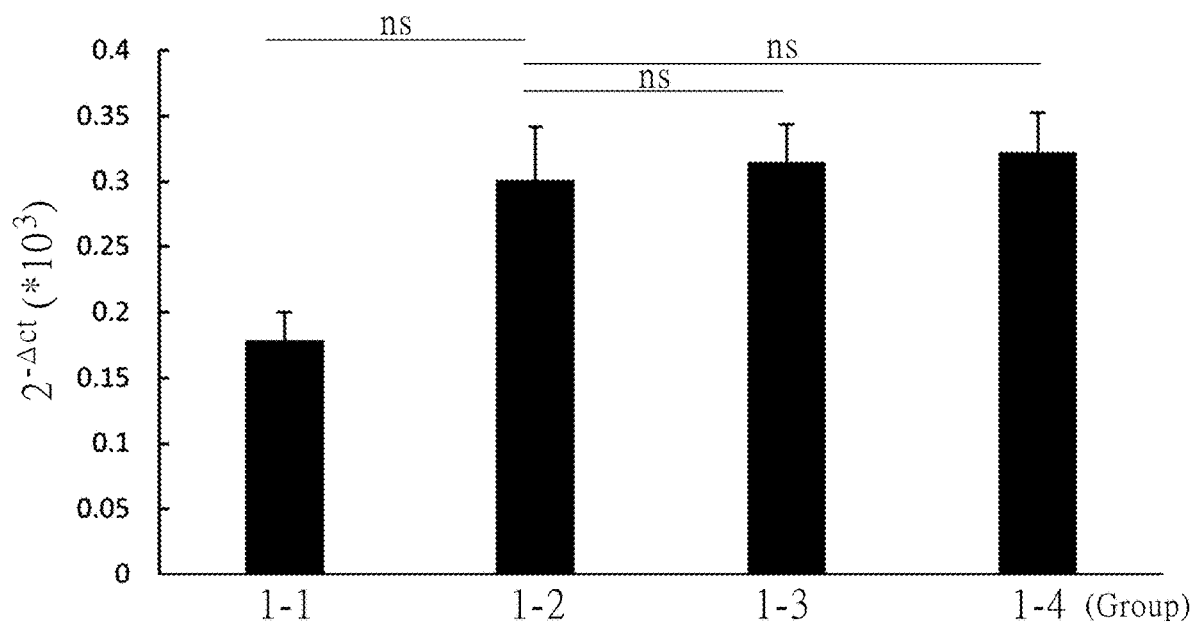
FIG. 11A is the result of statistical analysis of INF-γ expression levels in the lung tissues of mice in each group in the experimental group I, in which "ns" represents no statistically significant difference in the figure.
Figure 11B:
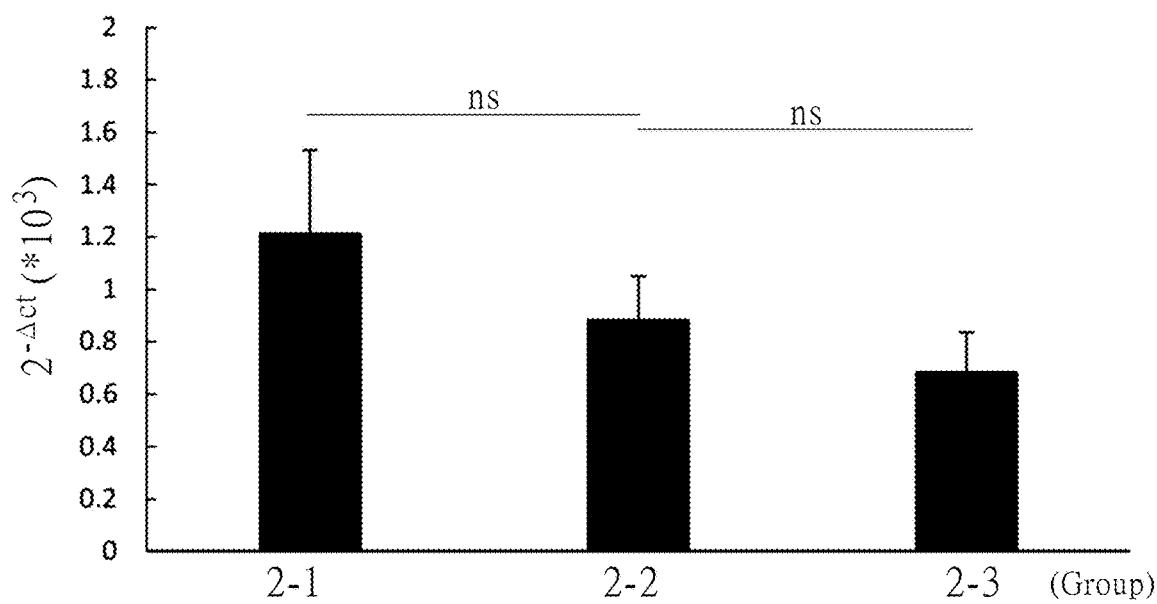
FIG. 11B is the result of statistical analysis of INF-γ expression levels in the lung tissues of mice in each group in the experimental group II, in which "ns" represents no statistically significant difference in the figure.

Furthermore, lung tissues of the mice in each group are taken, and tissue sections and H&E staining are performed to calculate a number of cells in the lung tissues, the results are shown in FIG. 8 and FIG. 9. In addition, referring to the steps of detecting an expression level of IL-31 in the skin tissues in Example 5, expression levels of IL-13 and INF-γ in the lung tissues of the mice in each group are detected, and the results are shown in FIG. 10 and FIG. 11, wherein the primer pairs used are shown in Table 4 below.

TABLE 4

List of primer pairs

| Name | Sequence number |
| --- | --- |
| IL-13 forward primer | SEQ ID No: 7 |
| IL-13 reverse primer | SEQ ID No: 8 |

TABLE 4-continued

List of primer pairs

| Name | Sequence number |
| --- | --- |
| INF-γ forward primer | SEQ ID No: 9 |
| INF-γ reverse primer | SEQ ID No: 10 |

From the results of FIG. 8 and FIG. 9, it can be known that compared with the lung tissues of the mice in group 1-1 and group 2-1, the lung tissues of the mice in group 1-2 and group 2-2 have significant cellular infiltration and inflammatory reaction respectively, and eosinophil and total number of cells are significantly increased; and from the results of FIG. 10 and FIG. 11, it can be known that compared with the lung tissues of the mice in group 1-1 and group 2-1, expression levels of IL-13 in the lung tissues of the mice in group 2-1 and group 2-2 are significantly increased. The results show that intratracheal challenge treatment is capable of reliably inducing allergic inflammation in the lung tissues of the mice, and indeed symptoms of inflammation and infiltration also occur, which means that intratracheal challenge treatment is capable of inducing allergic asthma in the mice.

Compared with mice in groups 1-2 and 2-2, not only inflammation and infiltration in the lung tissues in the mice in groups 1-4 and 2-3 are significantly improved, but also eosinophil and total number of cells are reduced respectively; and further compared with number of cells and inflammation and infiltration in the lung tissues of the mice in group 1-3, it can be known that state of the lung tissue sections and expression levels of inflammatory factors in the mice in groups 1-4, 2-3, and 1-3 are almost the same. The results confirm that the recombinant *Lactococcus* disclosed in the invention is capable of reliably expressing the D2P2 protein with amino acid sequence of SEQ ID No: 2 in the individual's body, and effectively achieving an efficacy of resisting tracheal allergies caused by dust mite or cockroach allergens, such as asthma, etc., and treatment or improvement effect is equivalent to clinical steroid drugs.

What is claimed is:

1. A recombinant lactic acid bacterium capable of expressing a heterologous protein, and amino acid sequence of the heterologous protein being coded as SEQ ID No: 2, wherein a genome of the recombinant lactic acid bacterium comprises an exogenous nucleic acid molecule, and a sequence of the exogenous nucleic acid molecule is coded as SEQ ID No: 1.

2. The recombinant lactic acid bacterium as claimed in claim 1, wherein the recombinant lactic acid bacterium is prepared from a food-grade lactic acid bacterium through a biotechnology.

3. The recombinant lactic acid bacterium as claimed in claim 2, wherein the food-grade lactic acid bacterium is a Lactococcus.

* * * * *